United States Patent [19]

Harvey

[11] 3,754,917
[45] Aug. 28, 1973

[54] PHOTOGRAPHIC FILM UNIT ASSEMBLAGE

[75] Inventor: Donald M. Harvey, Rochester, N.Y.
[73] Assignee: Eastman Kodak Company, Rochester, N.Y.
[22] Filed: May 1, 1970
[21] Appl. No.: 33,677

[52] U.S. Cl. ................................. 96/76 C, 95/13
[51] Int. Cl. ............................................ G03c 1/48
[58] Field of Search ........................... 96/29, 3, 76

[56] References Cited
UNITED STATES PATENTS

| | | | |
|---|---|---|---|
| 2,662,822 | 12/1953 | Land | 96/29 |
| 2,603,565 | 7/1952 | Land | 96/29 |
| 3,619,192 | 11/1971 | Land | 96/29 |
| 3,615,539 | 10/1971 | Land | 96/29 |
| 3,311,473 | 3/1967 | Foster et al. | 96/29 |
| 3,415,644 | 12/1968 | Land | 96/3 |

Primary Examiner—Norman G. Torchin
Assistant Examiner—John L. Goodrow
Attorney—Robert W. Hampton and J. Addison Mathews

[57] ABSTRACT

A photographic film unit assemblage, a cartridge for containing the assemblage, and a camera adapted to receive the cartridge, and to expose and initiate processing of film in the assemblage, are disclosed. The assemblage comprises relatively stiff integral film unit that is supplied before exposure and remains after processing as a single preregistered structure including both photosensitive and image receiving layers. The integral film unit is strippably attached to a relatively flexible carrier by which it may be transported within and out of the camera, and from which it automatically may be separated by pulling the carrier in a direction divergent to the plane defined by the film unit. A container of processing solution and a trap for collecting excess solution cooperate with the film unit during processing but are securely adhered to and remain with the carrier upon stripping of the film unit from the carrier. The carrier, pod, trap, and any other processing waste material then may be advanced into a storage device for later disposal. Preferably, the cartridge and storage device are combined so that the waste material need never be handled by the camera operator either upon introducing the cartridge into the camera or upon disposal of the cartridge after exposure and processing of the film unit.

11 Claims, 15 Drawing Figures

DONALD M. HARVEY
INVENTOR.

BY J. Addison Mathews
Robert W. Hampton
ATTORNEYS

DONALD M. HARVEY
INVENTOR.

BY
ATTORNEYS

DONALD M. HARVEY
INVENTOR.

PHOTOGRAPHIC FILM UNIT ASSEMBLAGE

BACKGROUND OF THE INVENTION

The present invention relates to a photographic film unit assemblage of the self-processing type.

It is well known in the photographic arts to provide cameras and film assemblages with means for developing the film after its exposure. Such means have taken many different forms, but regardless of the particular form used, have been unable to overcome certain persistent problems. In one form, for example, that illustrated in U.S. Pat. No. 3,161,122, issued to Mr. J. A. Hamilton on Dec. 15, 1964, individual photo-sensitive and transfer sheets must be separated during exposure, brought into registration or superposition during processing, and then again separated or peeled apart to produce a finished, right-reading image. Not only is the mechanical operation for superposing the respective sheets complex, but the peel-apart operation must be accomplished manually after a certain period of time, and in the presence of a usually highly caustic processing solution that can cause irritation to the skin, damage to clothing, or other injury to materials with which it comes into contact. Then after peeling of the print from the photosensitive material, means must be found for disposing of the processing waste material, including the previously mentioned caustic solution, and perhaps at the same time the camera operator is trying to stage his next photograph.

In order to solve some of the above-mentioned problems, integral film units have been developed. In a preferred form of integral unit, the photosensitive material is exposed through a transparent cover or processing sheet, that may also comprise image receiving material, and an opaque processing solution is spread between the sheets to prevent further exposure during development exterior of the camera. Examples of such integral units are disclosed in U.S. Pat. Nos. 3,415,644; 3,415,645; and 3,415,646, and in commonly assigned U.S. Pat. application Ser. No. 869,186, entitled PHOTOGRAPHIC FILM UNIT FOR DIFFUSION TRANSFER PROCESSING, filed on Oct. 24, 1969, in the name of Harold E. Cole and now abandoned. These film units do in fact solve many of the above-mentioned problems, but concurrently therewith make various other problems even more difficult to solve. For example, in such film units the finished print is not stripped from the photosensitive material, and some other mechanism must be employed for separating the unit from processing and film-transporting waste. On first glance one might believe that the solution of this problem would be relatively simple, but on further consideration it will be realized that previous prints ordinarily were stripped along an interface between photosensitive and print receiving sheets moistened by a processing solution that aided the stripping operation. With integral units, on the other hand, the stripping interface at least between the unit and the transporting web or carrier ordinarily is dry and stripping is much more difficult. Moreover, the photographer often will not have scissors or other shearing means at his disposal, and, even if he were to have such means handy, he often will not be expert enough to separate the waste material from the finished print with sufficient accuracy or straight edge alignment to provide a final print of pleasing aesthetic appearance. Still further, integral film units of these types ordinarily are relatively stiff and must be maintained in substantially flat relation during their processing and removal from the camera. Thus, any transport system must operate without applying significant distortional forces to the unit. Various solutions to these problems have been proposed. For example, in U.S. Pat. No. 3,415,644 it is proposed to provide an adhesive tape for securing a solution-containing pod to the film unit and from which the unit may be stripped after processing. Moreover, as disclosed in U.S. Pat. No. 3,447,437, the camera may be provided with a motor-driven film-transporting mechanism such that additional leaders connected to the film unit are not necessary. However, each of these solutions also suffers from many disadvantages. By way of example only, motorized systems in cameras require complex mechanisms which increase camera costs, weight, and bulkiness, and the attachment of pods and other elements by means of an adhesive tape in the above-mentioned manner still requires manual separation and disposal of the waste material.

SUMMARY OF THE INVENTION

It is an object of the present invention to overcome the above-noted disadvantages of previously known self-processing film units, and to provide an improved film unit assemblage suitable for use in photographic apparatus adapted to expose and initiate processing of film in the assemblage.

It is a further object of the present invention to provide a film unit assemblage comprising a film unit and a processing fluid container and an excess fluid trap that are coupled to and cooperate with the film unit during processing but at least one of which is removable from the unit after processing.

It is a further object of the present invention to provide a film unit assemblage including a leader or carrier for transporting the film unit within and from photographic apparatus, wherein the film unit is strippably attached to the carrier for separation therefrom after processing. In connection with this object, it is a further purpose of the present invention to provide such an assemblage that further includes a pod of processing solution and a trap for collecting excess solution, one or both of which are securely attached to and remain with the carrier upon stripping of the unit from the carrier.

It is a further object of the present invention to provide a self-processing integral film unit assemblage adapted for use in a cartridge including storage means for collecting processing waste material from which the integral film unit can automatically be stripped.

It is a further object of the present invention to provide a film unit assemblage usable with photographic apparatus adapted to expose and initiate processing of the film unit, wherein the film unit is strippably attached to a carrier by which the unit may be transported within and out of the apparatus and from which the unit automatically may be separated by pulling the carrier in a direction divergent to the plane defined by the unit.

In accordance with the preferred embodiment of the present invention, a relatively stiff integral film unit is strippably attached to a movable or actuatable member such as a relatively flexible carrier or web by which the unit may be transported within and out of a camera and from which the unit automatically may be separated by moving the carrier in a direction divergent to the plane defined by the unit. A pod processing solution and a trap for collecting excess solution cooperate with the unit during processing but the pod and/or trap is securely adhered to and remains with the carrier upon stripping of the unit from the carrier. The carrier, pod, and/or trap, and any other processing waste material, then may be advanced into a storage device for later disposal. The preferred embodiment may be used in cooperation with a combined cartridge and storage device that makes it unnecessary for the camera operator to handle processing materials either upon introducing the cartridge into the camera or upon later disposal of the cartridge.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
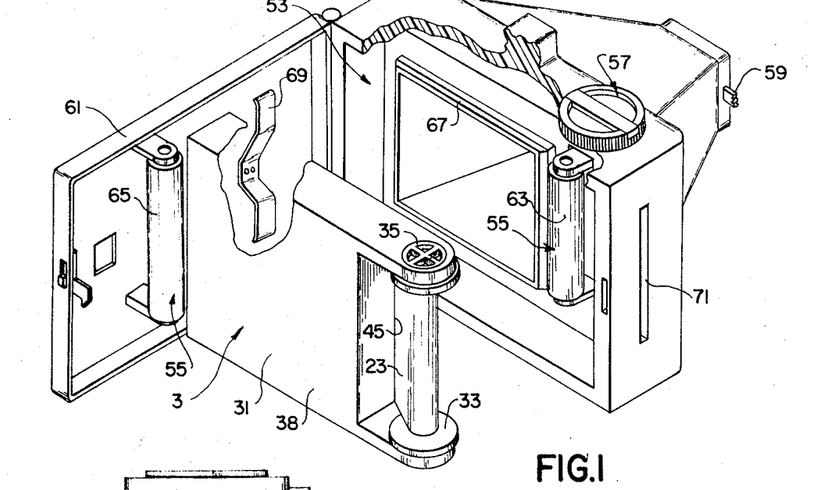
FIG. 1 is a pictorial view illustrating photographic apparatus, including a cartridge and camera, in which a film unit assemblage constructed in accordance with the preferred embodiment of the present invention may be used.
Figure 2:
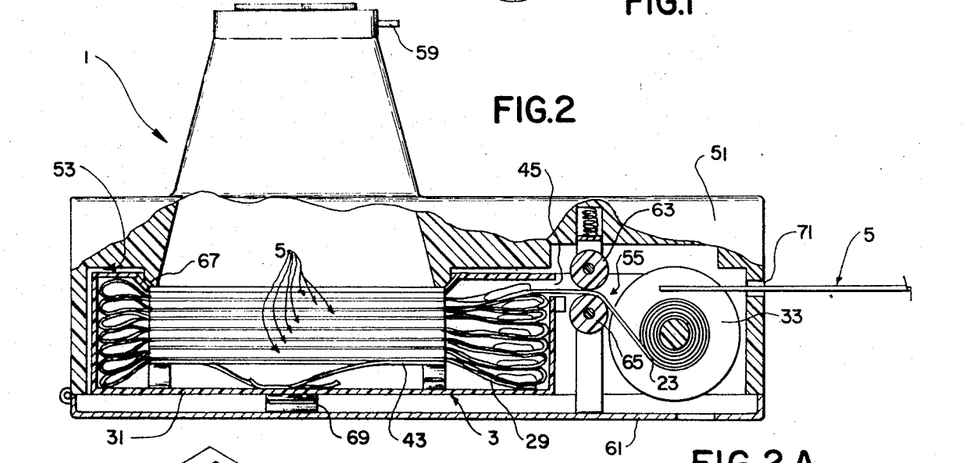
FIG. 2 is a top view of the photographic apparatus of FIG. 1 with the cartridge, containing a film unit assemblage constructed in accordance with the preferred embodiment of the present invention, loaded into the camera and with parts broken away to more clearly illustrate assemblage cartridge-camera cooperation and manner of operation.

Referring first to FIGS. 1 and 2, the preferred embodiment of the present invention is adapted for use with photographic apparatus such as a camera 1 and cartridge 3. The cartridge is adapted to receive a film unit assemblage comprising one or more relatively stiff, integral or composite film units that remain after processing and preferably are supplied before exposure as preregistered structures including both photosensitive and image-receiving layers. The units are attached with cooperating pods and traps to a carrier such as an elongate web or a leader system that interconnects all of the units and transports the units within and from the cartridge as the web is collected in an advancing and waste storage mechanism. The cartridge is received in the camera to position the unexposed integral film units behind an exposure aperture of the camera, and cooperates with the camera such that the leader system may be advanced by a winding mechanism accessible from the camera exterior. After exposure of the forwardmost film unit in the stack, the winding mechanism is operated to advance the leader system into the waste storage mechanism of the cartridge and this in turn advances a film unit and cooperating pod and trap between pressure-applying members for rupturing the pod and spreading a processing composition or process-inducing agent from the pod across the unit and into the trap. Continued rotation of the winding mechanism effects stripping of the integral film unit from the leader system, pod, and trap, and automatically expels the unit from the camera. Completion of the processing cycle then is effected exterior to the camera while the processing waste material remains on the camera interior for later disposal with the cartridge. In this way the waste material need never be handled by the camera operator, either upon introducing the cartridge into the camera or upon disposal of the cartridge after exhaustion of the film supply.

Figure 5:
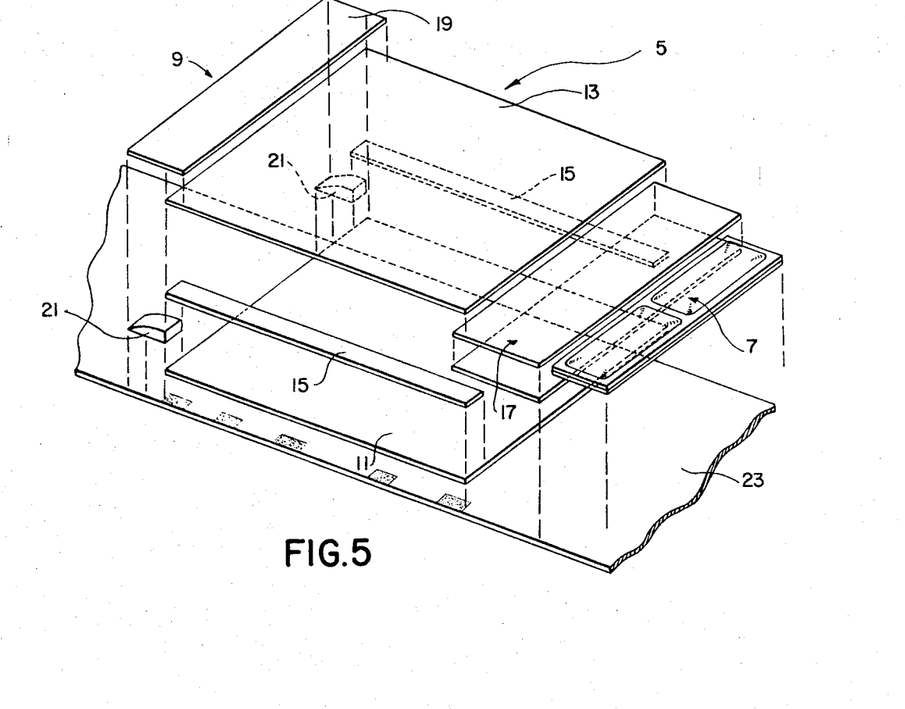
FIG. 5 is an exploded view of part of the film unit assemblage illustrated in FIG. 4.
Figure 6:
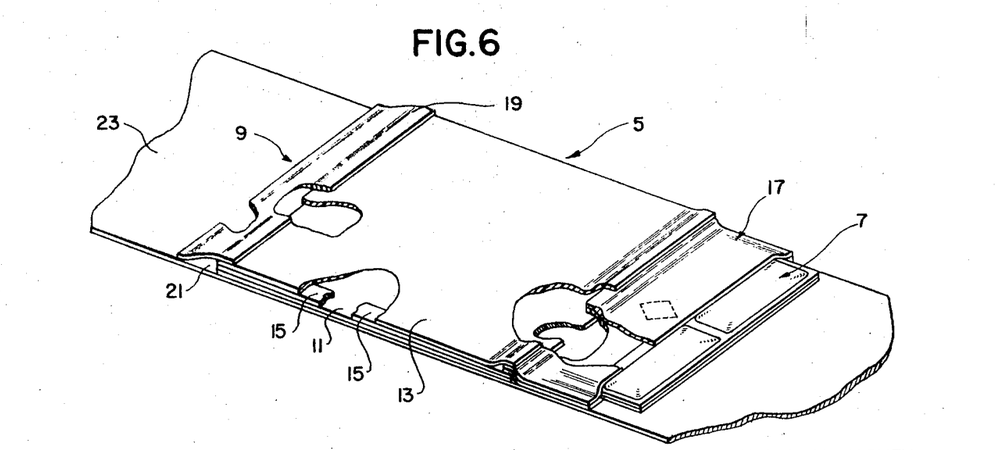
FIG. 6 is a composite view of the assemblage shown in FIG. 5, with parts broken away to more clearly illustrate otherwise concealed components thereof.

The film unit 5 is represented in FIGS. 5 and 6 with a cooperating pod or rupturable fluid container 7 and a trap or excess fluid collector 9. Units of this type are more clearly described and illustrated in commonly assigned U.S. Pat. Application Ser. No. 869,186, filed in the name of Harold E. Cole on Oct. 24, 1969, and now abandoned, the disclosure of which hereby is incorporated into the present application by reference. Briefly, each unit comprises a composite or integral structure including a first layer of photosensitive material for recording a latent image, a second layer of image receiving material or mordant for recording a developed image, and a processing-solution spreading mechanism for effecting development of the latent image in the first layer and transfer of that developed image to the second layer. In the presently preferred embodiment, both the first or photosensitive and second or mordant layers are supported in a single first sheet 11, while the spreading mechanism comprises a second sheet 13 that is pre-registered with the first sheet and serves generally to control and contain the processing solution as that solution is spread over the first sheet to effect processing. Preferably, these first and second sheets remain in the integral or composite condition both before exposure and after processing, but it is conceivable that they also could be supplied in a separated condition from which they permanently could be registered after the exposure operation. The unit further includes spacing members 15 longitudinally arranged in parallel relation along each edge of the unit to define a predetermined distance of separation between the first and second sheets at least during processing and to confine the processing solution in a layer of predetermined thickness between the edges of the unit.

The pod 7 is defined generally by one or more sheets of vapor-impervious material that are securely sealed around three edges to define a fluid container and include a rupturable seal along the fourth edge for discharging fluid from the pod. The pod also may include or cooperate with means such as one or more fluid-flow controlling elements comprising a conduit or funnel 17 for directing fluid expelled from the pod to the interface defined between the first and second sheets 11 and 13. The trap, on the other hand, includes a skirt 19 that overlies the film unit and spacers 21 that operate to collect excess processing solution at the opposite end of the unit from the pod.

The pod and trap components all are securely adhered to a leader system or elongate transporting web 23, to be described more fully hereinafter, while the integral unit is only strippably attached in a manner permitting its separation by the application of a force to the leader or web and in a direction divergent to the plane defined by the unit. To permit stripping of the unit from the pod (including the funnel) and trap, these components are releasably coupled to the unit by inserting the rupturable edge of the pod or its funnel between the sheets 11 and 13 but without securing the same to the unit in any positive or unyielding manner. Similarly, the skirt portion 19 of the trap is adapted to overlie the unit but also is not secured to the unit in a positive or unyielding manner. Thus, as the leader system or transporting web is pulled away from the unit, the pod or funnel will be free to pull away from the interface between the sheets, while the skirt 19 of the trap will be free to slide off of the upper surface of the processing sheet. The mechanisms of this operation will be described more fully hereinafter and are more clearly illustrated in FIGS. 7–9.

Figure 4:
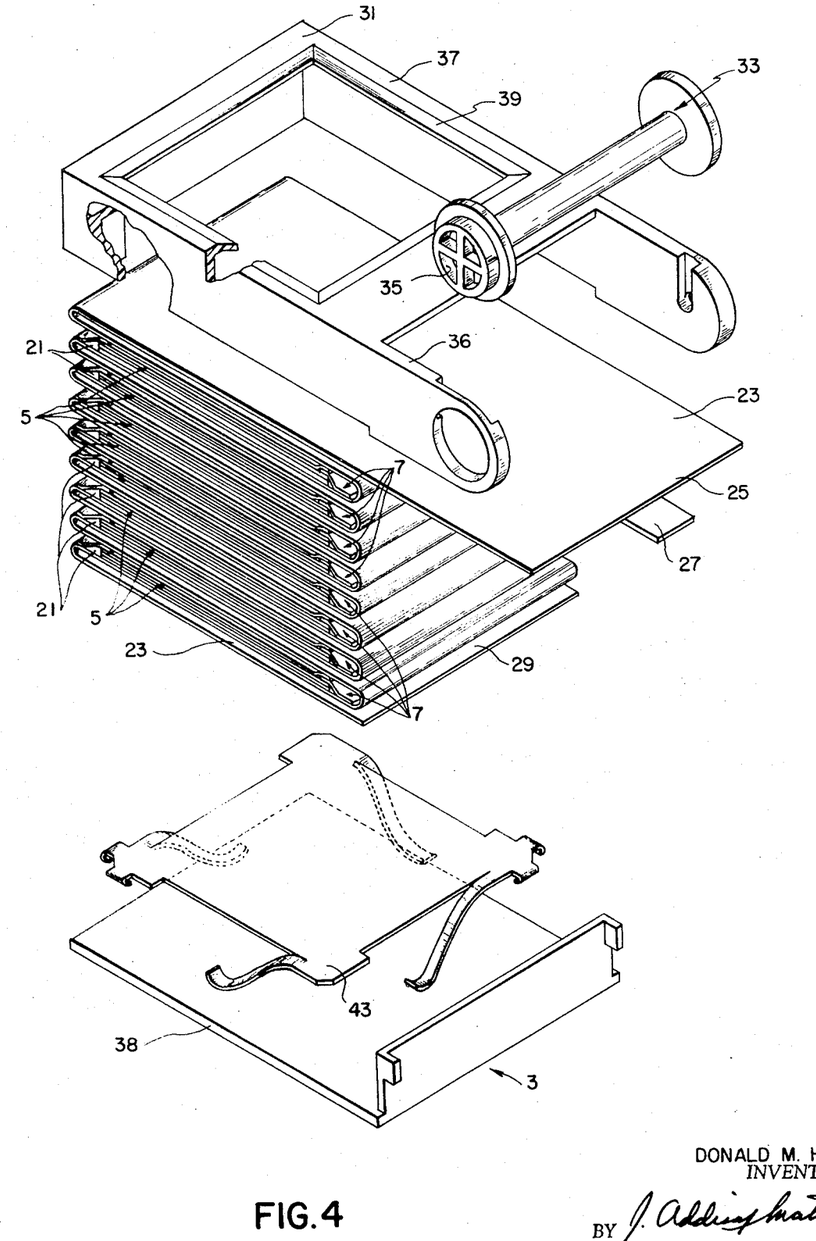
FIG. 4 is an exploded view of the cartridge of FIG. 1 and a film unit assemblage in accordance with the preferred embodiment of the present invention disposed for use in the cartridge.

Referring now to FIG. 4, the preferred assemblage of film units is illustrated with a leader system comprising the elongate web 23 to which each of the film units is coupled for transporting the units within and from the cartridge, and from which the units may be separated by pulling the leader in a direction divergent to the plane defined by the respective film unit being stripped from the leader. This type of connection is provided by an adhesive coupling that is relatively strong in shear but weaker in tension: such that pulling of the leader in a direction substantially parallel to the plane defined by the unit is not likely to cause separation of the unit from the leader, but pulling of the leader away from the plane defined by the unit will cause separation of the unit from the leader.

Figure 3:
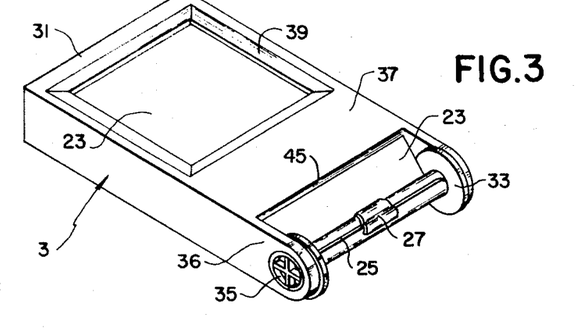
FIG. 3 is a pictorial view of the cartridge of FIG. 1 illustrating the exposure aperture and waste material storage device.

The units are received in cartridge 3 in stacked relation with the leading edge of one unit aligned with the leading edge of the other units. The web, on the other hand, winds back and forth between the respective units, and each unit is coupled on a single side of the web such that the units would be arranged in a head-to-tail relationship if the web were pulled from the cartridge and layed out in an extended or flat position. The forwardmost or leading portion 25 of the transporting web includes an adhesive element 27 (FIGS. 3 and 4) for connecting the web to a waste collecting mechanism to be described more fully hereinafter in connection with the cartridge. This leading portion of the transporting web also may be opaque to light actinic to the film units and may extend across the cartridge exposure aperture to provide a dark cover for preventing premature exposures and otherwise protecting the film. A trailing portion of the transporting web 29 also may be folded beneath the rearwardmost film unit in the cartridge to protect that unit against scratching or damage by the platen or foreign material that accidentally might have entered the cartridge.

The cartridge 3 includes a disposable casing 31 that defines a supply chamber or compartment adapted to receive a plurality of integral film units in stacked relation, and further supports a transporting an waste collecting mechanism illustrated as a spool 33 having a clutch 35, or other appropriate engaging mechanism, adapted to cooperate with a camera winding mechanism for effecting the transport of film units within and from the camera. This spool is rotatably mounted in parallel arms 36 of the cartridge that extend outwardly of the supply chamber to support the spool at a position substantially midway between the cartridge front and back walls 37 and 38 at one end of the cartridge. In order to permit proper alignment between the cartridge and the camera, the front wall of the cartridge includes light sealing and aligning surfaces 39 adapted to mate with corresponding camera surfaces to properly locate the forwardmost film unit in a focal plane defined by the camera objective. The cartridge back wall further supports a film platen 43 for resiliently urging each of the respective film units in the cartridge toward its forwardmost position for proper alignment in the film plane. Film is adapted to exit from the supply chamber through means defining a slot or opening 45 located adjacent to the chamber forward wall at the same end of the supply chamber as take-up spool 33. The spool, however, is spaced from the opening or exit slot, both in a longitudinal direction away from the end of the supply chamber and in a rearward direction away from the forward wall, for purposes to become more fully apparent hereinafter.

Figure 2A:
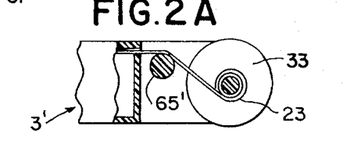
FIG. 2a is a partial view of a modification of the cartridge illustrated in FIG. 1 wherein the cartridge includes one of the pressure members.

The camera is most clearly illustrated in FIGS. 1 and 2 and generally comprises a casing 51 defining a cartridge receiving or supply chamber 53 and supporting various camera components, including a pressure-applying mechanism 55, a film winding mechanism 57, a body release or operating member 59, and a closure or cover door 61. The cartridge is inserted into the camera by opening the cover door which thereby permits access to the supply chamber and separates a pair of juxtaposed pressure-applying members 63 and 65 of the pressure-applying mechanism. This permits seating of the cartridge against a light seal 67 and positioning of the pressure-applying members on opposite sides of the film transporting web 23. The closure member or cover door then is pivoted and latched in a closed position wherein the cartridge is resiliently urged against the sealing and locating surfaces by spring 69, and the respective members of the pressure-applying mechanism are operatively positioned in opposed contact with the transporting web on opposite sides of the intended path of movement of the film units. This path is defined by the cartridge exit slot 45, the location of the bite between the pressure-applying members 63, 65, and a camera exit slot 71, all of which lie in a substantially straight line when the cartridge is in the camera and the cover door is closed. In this manner the film units can be advanced substantially in a straight line and without flexing from the cartridge through the camera and to its exterior. Unlike the film units, however, web 23 is adapted to be flexed somewhat sharply from the path taken by the film units and for this purpose is directed through the pressure-applying members and then downwarldy to the lowermost side of the take-up spool or winding core 33. Of course this could be accomplished in other ways, as illustrated in FIG. 2a, for example, where one of the pressure-applying members comprises a part of the cartridge. Regardless of the particular apparatus used, the web take-up means directs movement of the web to effect an increase in the distance between the web and the film unit and to effect their separation.

Figure 7:
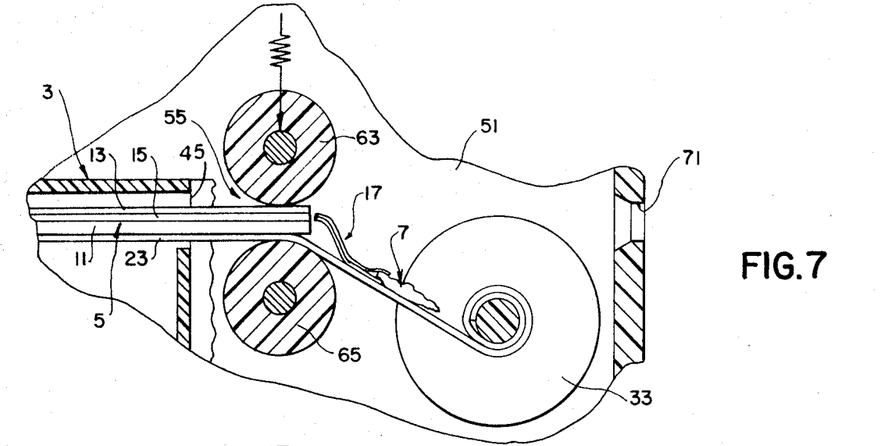
FIGS. 7, 8, and 9 are schematic views illustrating various stages in the operation of the transporting and waste storage system.
Figure 8:
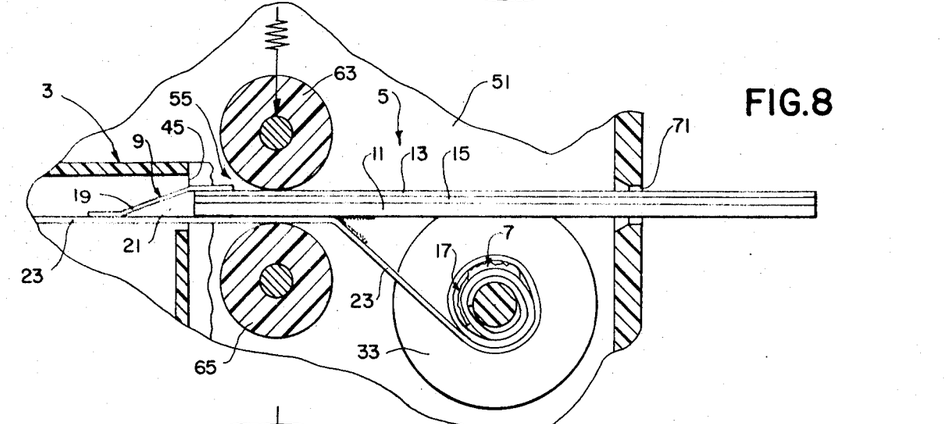
Figure 9:
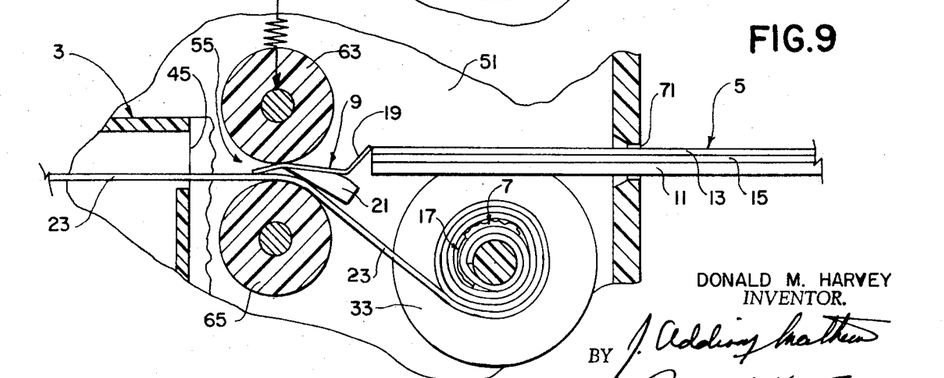

Referring now to the operation of one aspect of the preferred embodiment, and to FIGS. 7–9, the leader system or transporting web 23 and the film unit 5 are illustrated in three different positions of operation. The first position, depicted in FIG. 7, represents a period in time after exposure of the unit and after initial winding of the take-up mechanism to pull the unit out of the cartridge and into the bite of the pressure-applying mechanism. In this position the unit is maintained in a substantially flat condition by supporting engagement at one end between the pressure-applying members and at the middle and other end by the cartridge exit slot 45 and forward wall 37. The leader on the other hand is maintained in a relatively taut condition by the pressure-applying mechanism and flexes around the lowermost pressure-applying member 65 for movement onto the take-up spool 33 in a direction divergent to the plane defined by the film unit. Because of this direction taken by the web, the pod and its funnel, which are securely attached to the web, move in a direction that increases the distance between the pod and the unit and pulls the rupturable edge of the pod or the funnel out of the interface between the sheets of the unit to strip the unit from the pod and funnel. Continued winding of the take-up mechanism then will wind this pod and funnel onto the take-up spool while continuing to advance the film unit in substantially the same plane until the leading end of the unit enters and projects out through the camera exit slot 71.

In the second position depicted in FIG. 8, the leading end of the unit is projecting from camera exit slot 71, and the unit is supported in substantially flat condition by this exit slot and the bite between the pressure-applying members, while the transporting web 23 continues to be stripped from the lower surface of the unit by its movement in a direction divergent to the plane defined by the unit. This stripping between the film unit and the transporting web generally is effected by a change in the forces between the unit and web from the shear forces used in transporting the unit to forces having at least a significant component in tension for separating the unit from the web.

In the third illustrated position, represented in FIG. 9, the trap 9 is being drawn between the bite of the pressure-applying members and, in a manner similar to that described above for the pod, is pulled away from the unit because of increasing distances between the unit and the trap's point of attachment to the web as the web moves downwardly away from the plane defined by the unit. Also like the pod stripping operation described above, this trap will be wound onto the take-up spool 33 as winding of this spool is continued, and the unit will be left supported in the camera exit slot in a condition entirely detached from the transporting web and from which it may be grasped and compeltely expelled by the camera operator. Of course, it also should be understood that the mechanism could be so arranged that the unit is automatically expelled completely from the camera without any assistance whatsoever from the camera operator. In either case, however, the outer surfaces of the unit are in a dry condition when they are first handled by the camera operator while the film transporting and processing waste material, that will include any excess solution, are wound into the spool or take-up mechanism of the cartridge and need never be directly handled by the camera operator. Moreover, since the processing solution spread between the sheets of the unit includes an opacifier, and since the processing chemistry of the unit is self-timing, the unit may be expelled from the camera immediately after exposure and automatically will be processed to completion without any necessary intervention by the camera operator either to time the processing cycle or to strip a finished print from the photosensitive material.

Referring now to certain modifications of the film advancing mechanism in the camera, FIGS. 10–14 illustrate various mechanisms for advancing the film and or for automatically metering such advancement. In most respects the illustrations of these embodiments are believed to be self-explanatory and they will not be described in detail. However, brief descriptions are set forth below.

Figure 10:
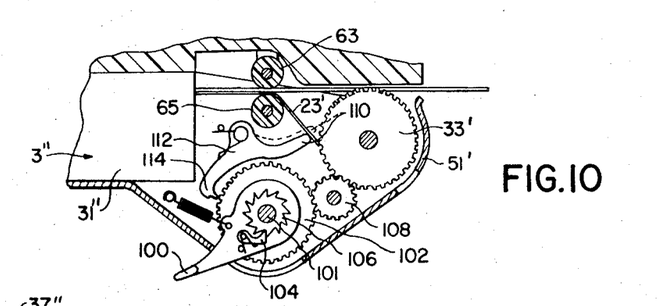
FIG. 10 illustrates a modification of the camera of FIG. 1 for manually effecting the transport and metering of film units within and from the camera.

In the modification of FIG. 10 the transporting web 23' is provided with perforations along one edge thereof in positions properly pitched to effect blocking of further advancement of the transporting web after the next preceeding unit has been expelled from the camera and just before the web will begin to advance the next successive unit that then is positioned in the cartridge exposure aperture. While the exact configuration and location of the perforations have not been shown in FIG. 10, they would be similar to those of the perforation shown in FIG. 11 and also could be selected from other appropriate designs well known to persons skilled in the art. The film is advanced by a lever 100 accessible from the camera exterior for reciprocation about pivot point 101. Such reciprocating movement of the lever is transferred to a driving gear through a one-way clutch comprising the pawl 104 and ratchet 106 which drivingly engage during counter-clockwise movement of the lever 100 but which slip relative to each other during clockwise or return movement of the lever. This winding force is then translated from the gear 102, to effect rotation of winding spool 33' much in a manner described above, through a spur gear 108 having teeth that mesh both with the driving gear and with teeth provided on the winding spool. Reciprocation of the winding lever 100 to advance the film is continued until a first end 110 of a metering pawl 112 drops into a perforation in the film to position the other end 114 of the pawl in locking engagement with the driving gear 102 of the winding mechanism. This prevents further winding of the transporting web and advancement of the film at the proper position for the next successive exposure. After that next exposure, the metering pawl again is pivoted out of the perforation by means, not shown, accessible from the camera exterior to permit further advancement of the film and positioning of still another film unit at the exposure aperture.

Figure 11:
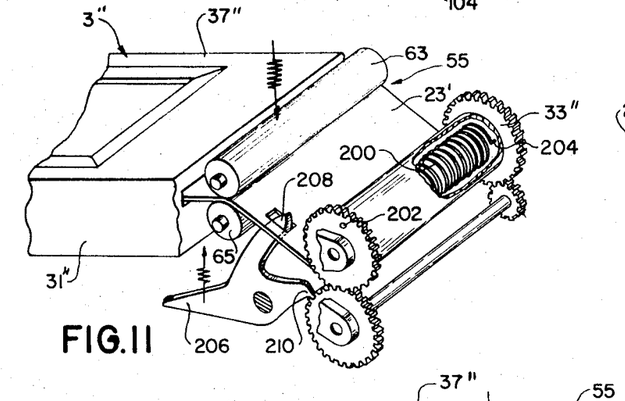
FIGS. 11 and 12 depict yet another modification wherein transport and metering of the film units is effected by a spring motor.
Figure 12:
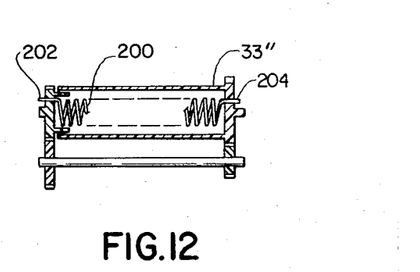

Another modification of the film-advancing mechanism is illustrated in FIGS. 11 and 12 and operates in a manner similar to that described in connection with the modification of FIG. 10 except that driving energy or power for advancing the transporting web is supplied by means of a coil spring 200 located within the core of spool 33" and having one end 202 coupled to a gear mounted for coaxial rotation relative to spool 33" and another end 204 coupled to a gear integral with spool 33", both such gears being in meshing engagement with a pair of gears fixed to a common, freely rotatable shaft to provide a differential gear train as shown. Again, and like the embodiment of FIG. 10, metering of film advancement is effected automatically by a metering pawl 206 including a first end 208 adapted to enter a film perforation to position a second end 210 in locking engagement with the winding mechanism.

Figure 13:
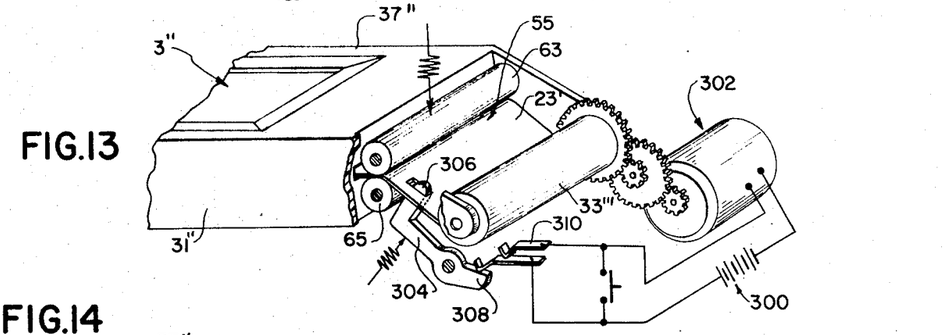
FIG. 13 depicts a further modification for electrically transporting and metering film units.

Yet another modification of the film advancing and metering mechanism is illustrated in FIG. 13, and in this case is powered by energy supplied from an electrical source including, for example, a battery 300 and motor 302. A metering pawl 304 includes a first end 306 for entering a film perforation in the manner described above, and a second end 308 adapted to open the electrical circuit for driving motor 302 and stop further film winding when the first end 306 enters the film perforation.

Figure 14:
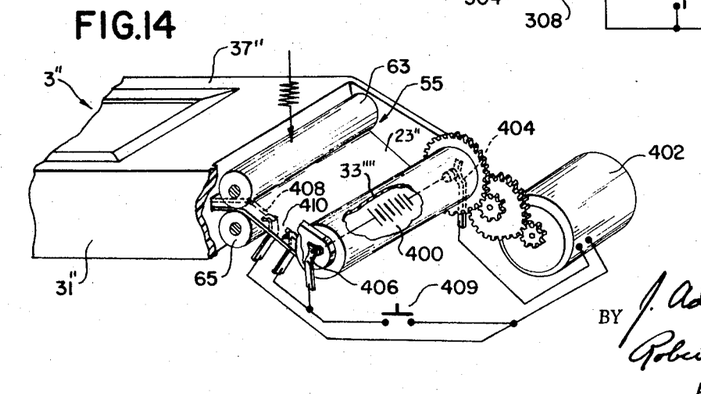
FIG. 14 illustrates yet another electrical modification for transporting and metering the advancement of film units within the camera.

Yet another modification for advancing and metering advancement of the transporting web is illustrated in FIG. 14. In this case the battery or source of electrical energy 400 may be supplied with the cartridge within the core of winding spool 33"" and is electrically connected to the driving motor 402 through appropriate contacts 404 and 406 on the cartridge. In this modification embodiment, however, electrically conductive material 408 is supplied on one edge of the film in lieu of the perforations described above, and this conductive material is adapted to maintain the circuit in an energized condition, once it is energized by operating switch 409, for driving motor 402 until the gap 410 in the conductive material operates as a switch to break the circuit and discontinue such winding.

It should now be apparent from the above description and to those skilled in the art that an improved means has been provided for exposing and effecting the development of film, and that operates automatically to strip a finished integral print from transporting and processing waste material that need never be handled by the camera operator either upon later supplying the material to the camera or upon disposal of the material. Moreover, such means is particularly adapted for use with integral film units wherein the photosensitive and image receiving materials of the unit remain in a composite or integral condition both before exposure and after processing.

It also should now be apparent that precise alignment between the film units and the pressure-applying members is effected automatically upon advancing the film, nd is not dependent on the specific manner in which the camera is held or the film is advanced. Similarly, the winding mechanism is more likely to provide a uniform rate of advance than is attainable in apparatus where a leader is grasped and pulled from the camera, and the mechanism may be chosen to provide a mechanical advantage reducing the force that must be applied by the camera operator. Other novel features and advantages have been set forth above and will be apparent from the above to those skilled in the art.

The invention has been described in detail with particular reference to the preferred embodiment thereof, but it will be understood that variations and modifications can be effected within the spirit and scope of the invention.

I claim:

1. For use in a camera, a film unit assemblage adapted to record a developable latent image and to establish a visible image upon development of the latent image in response to application of a processing agent, said assemblage comprising:
  a. an integral film unit adapted for transport within the camera and including first and second sheet-like elements permanently secured together in face-to-face relation, said first element having a layer of photosensitive material for recording the latent image, one of said elements having a layer of image-receiving material for establishing the visible image, said second element being adapted to facilitate application of the processing agent to said layers;
  b. a separate carrier element strippably attached to said unit and movable therewith to effect the transport of said unit within the camera, said carrier element being adapted for movement relative to said unit and strippable therefrom in response to said movement; and
  c. a rupturable pod containing the processing agent for supplying said agent to said unit, said pod being separably coupled to said unit and permanently secured to said carrier element, said pod being separable from said unit along with said carrier element upon stripping of said carrier element from said unit.

2. An assemblage as claimed in claim 1 wherein said unit defines a plane, and wherein said movement of said carrier element relative to said unit includes movement of said carrier element in a direction divergent from said plane.

3. An assemblage as claimed in claim 1 wherein one of said unit and said carrier element is more flexible than the other to facilitate said relative movement therebetween, and wherein said relative movement includes flection of said one in a direction divergent from said other.

4. An assemblage as claimed in claim 1 wherein said carrier element is flexible relative to said unit, and wherein said carrier element and said pod together are removable from said unit in response to flection of said carrier element in a direction divergent from said unit.

5. An assemblage as claimed in claim 4 wherein said pod includes a portion thereof slidably inserted between said first and second elements, said portion being slidably removable from between said first and second elements in response to said flection of said carrier element.

6. An assemblage as claimed in claim 1 wherein said second element and one of said layers define an interface therebetween, and wherein said pod includes means for directing said agent from within said pod to said interface.

7. An assemblage as claimed in claim 6 wherein said directing means includes a funnel extending between said second element and said one of said layers.

8. An assemblage as claimed in claim 1 wherein said carrier element is strippably attached to said unit by adhesive means having a relatively high shear strength and a relatively low tensile strength.

9. An assemblage as claimed in claim 1 further comprising a trap for receiving and retaining any excess of said agent from said unit, said trap being separably coupled to said unit and permanently secured to said carrier element, said trap being separable from said unit along with said carrier element upon stripping of said carrier element from said unit.

10. For use in cooperating photographic apparatus, a film unit assemblage adapted to record and process a latent image, said assemblage comprising:
   a. a pair of substantially flat elements permanently coupled in facing relationship to each other, each of said elements having leading and trailing end portions and an image portion intermediate said end portions, said elements being partible at their leading end and image portions, one of said elements defining a plane;
   b. means for supplying a processing fluid to said image portions, said supplying means including a processing fluid source exterior of said elements and means for directing processing fluid from said source to said elements and in between said leading end portions, said directing means including an end removably disposed between said leading end portions; and
   c. a separate flexible support member removably attached to said one of said elements and fixedly secured to said supplying means for supporting said elements and said supplying means and for maintaining said directing means end between said leading end portions during use in the cooperating photographic apparatus, said support member and said supplying means together being readily removable from said elements upon application of an external force urging said support member to flex in a direction divergent from said plane.

11. An assemblage as claimed in claim 10 wherein said elements are also partible at their trailing end portions for admitting therebetween any excess of said processing fluid from said image portions, wherein said assemblage further comprises means removably disposed in overlapping relationship to said trailing end portions for receiving and retaining said excess fluid, and wherein said support member is fixedly secured to said receiving an retaining means to support said receiving and retaining means and to maintain said receiving and retaining means in said overlapping relationship to said trailing end portions during use in the cooperating photographic apparatus, said receiving and retaining means being readily removable from said elements upon movement of said support member away from said plane.

* * * * *